(12) United States Patent
Zhu et al.

(10) Patent No.: US 11,582,288 B2
(45) Date of Patent: Feb. 14, 2023

(54) FILE-BASED DOWNLINK TRANSMISSION AND RETRANSMISSION

(71) Applicant: QUALCOMM Incorporated, San Diego, CA (US)

(72) Inventors: Xipeng Zhu, San Diego, CA (US); Prashanth Haridas Hande, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/889,489

(22) Filed: Jun. 1, 2020

(65) Prior Publication Data

US 2020/0396275 A1   Dec. 17, 2020

Related U.S. Application Data

(60) Provisional application No. 62/862,007, filed on Jun. 14, 2019.

(51) Int. Cl.
*H04L 67/06* (2022.01)
*H04L 1/16* (2006.01)
(Continued)

(52) U.S. Cl.
CPC ............ *H04L 67/06* (2013.01); *H04L 1/0041* (2013.01); *H04L 1/1685* (2013.01);
(Continued)

(58) Field of Classification Search
CPC ....... H04L 67/06; H04L 1/1685; H04L 67/38; H04L 1/1896; H04L 1/0041; H04L 1/1864; H04L 1/1848
See application file for complete search history.

(56) References Cited

U.S. PATENT DOCUMENTS

| 7,558,247 | B2 * | 7/2009 | Lee | H04W 28/06 |
| | | | | 370/395.21 |
| 7,733,867 | B2 * | 6/2010 | Conner | H04L 69/164 |
| | | | | 370/474 |

(Continued)

OTHER PUBLICATIONS

International Search Report and Written Opinion—PCT/US2020/035755—ISA/EPO—dated Nov. 23, 2020.
(Continued)

*Primary Examiner* — Yaotang Wang
(74) *Attorney, Agent, or Firm* — Muncy, Geissler, Olds & Lowe, P.C.

(57) ABSTRACT

Disclosed are techniques for wireless communication. In an aspect, a network entity transmits, to a user equipment (UE), at least one file, the at least one file comprising a group of data packets, wherein each data packet of the group of data packets of the at least one file is associated with a file identifier of the at least one file, transmits, to the UE, after transmitting the last data packet of the group of data packets of the at least one file, a request for the UE to report a reception status of the at least one file, transmits, to the UE, one or more repair bits for the at least one file, receives an acknowledgment from the UE, and ceases transmission of the one or more repair bits upon reception of the acknowledgment from the UE.

30 Claims, 11 Drawing Sheets

(51) Int. Cl.
  *H04L 1/18*     (2006.01)
  *H04L 1/00*     (2006.01)
  *H04L 67/131*   (2022.01)
  *H04L 1/1607*   (2023.01)
  *H04L 1/1867*   (2023.01)
  *H04L 1/1829*   (2023.01)

(52) U.S. Cl.
  CPC .......... *H04L 1/1864* (2013.01); *H04L 1/1896* (2013.01); *H04L 67/131* (2022.05)

(56) References Cited

U.S. PATENT DOCUMENTS

| | | | | |
|---|---|---|---|---|
| 11,070,976 | B2* | 7/2021 | Wang | H04W 8/30 |
| 2005/0213605 | A1* | 9/2005 | Kim | H04W 28/06 |
| | | | | 370/310 |
| 2008/0130619 | A1* | 6/2008 | Cha | H04L 1/1685 |
| | | | | 370/346 |
| 2009/0006641 | A1* | 1/2009 | Yaqoob | H04L 12/1868 |
| | | | | 709/231 |
| 2010/0017673 | A1* | 1/2010 | Lu | H04L 1/1854 |
| | | | | 714/E11.131 |
| 2010/0195519 | A1* | 8/2010 | Ji | H04L 1/1848 |
| | | | | 370/252 |
| 2015/0304378 | A1* | 10/2015 | Bi | H04L 65/611 |
| | | | | 370/329 |
| 2020/0044789 | A1* | 2/2020 | Beale | H04L 1/1858 |

OTHER PUBLICATIONS

"3rd Generation Partnership Project, Technical Specification Group Services and System Aspects; Security; Protocol and procedures for Lawful Interception (LI); Stage 3 (Release 15)", 3GPP Draft, 33128-008C RM, 3rd Generation Partnership Project (3GPP), Mobile Competence Centre, 650, Route Des Ludoles, F-06921, Sophia-Antipolis Cedex, France, Mar. 1, 2019 (Mar. 1, 2019), XP051611737, 65 pages, Retrieved from the Internet: URL: http://www.3gpp.org/ftp/tsg%5Fsa/WG3%5FSecurity/TSGS3%5FLI/2019%5F72bis%5FDusseldorf/Docs/s3i190169%2Ezip [retrieved on Mar. 1, 2019.
Huawei., et al., "On Supporting Ultra-Reliability in a Resource Efficient Way", 3GPP Draft, 3GPP TSG RAN WG1 Meeting #90bis, R1-1717083, 3rd Generation Partnership Project (3GPP), Mobile Competence Centre ; 650, Route Des Lucioles ; F-06921 Sophia-Antipolis Cedex ; France vol. RAN WG1, No. Prague, Czech Republic; Oct. 9, 2017-Oct. 13, 2017, Oct. 2, 2017, XP051352189, 5 pages, Retrieved from the Internet: URL:http://www.3gpp.org/ftp/tsg_ran/WG1_RL1/TSGR1_90b/Docs/ [retrieved on Oct. 2, 2017].
Partial International Search Report—PCT/US2020/035755—ISA/EPO—dated Sep. 17, 2020.

* cited by examiner

FILE-BASED DOWNLINK TRANSMISSION AND RETRANSMISSION

CROSS-REFERENCE TO RELATED APPLICATIONS

The present application for Patent claims the benefit of U.S. Provisional Application No. 62/862,007, entitled "FILE-BASED DOWNLINK TRANSMISSION AND RETRANSMISSION," filed Jun. 14, 2019, assigned to the assignee hereof, and expressly incorporated herein by reference in its entirety.

INTRODUCTION

Aspects of this disclosure relate generally to telecommunications, and more particularly to file-based downlink transmission and retransmission.

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, also referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

Due to the increased speeds and reduced latency offered by 5G, technologies that require high data rates and low latency, such as extended reality (XR), can now utilize cellular networks for wireless communications.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a network entity includes transmitting, to a user equipment (UE), at least one file, the at least one file comprising a group of data packets, wherein each data packet of the group of data packets of the at least one file is associated with a file identifier of the at least one file, transmitting, to the UE, after transmitting the last data packet of the group of data packets of the at least one file, a request for the UE to report a reception status of the at least one file, transmitting, to the UE, one or more repair bits for the at least one file, receiving an acknowledgment from the UE for the at least one file, and ceasing transmission of the one or more repair bits upon reception of the acknowledgment from the UE.

In an aspect, a method of wireless communication performed by a UE includes receiving, from a base station, at least one file, the at least one file comprising a group of data packets, wherein each data packet of the group of data packets of the at least one file is associated with a file identifier of the at least one file, receiving, from the base station, a request for the UE to report a reception status of the at least one file, receiving, from the base station, one or more repair bits for the at least one file, and transmitting, to the base station, an acknowledgment for the at least one file.

In an aspect, a network entity includes a memory, at least one transceiver, and at least one processor communicatively coupled to the memory and the at least one transceiver, the at least one processor configured to: cause the at least one transceiver to transmit, to a UE, at least one file, the at least one file comprising a group of data packets, wherein each data packet of the group of data packets of the at least one file is associated with a file identifier of the at least one file, cause the at least one transceiver to transmit, to the UE, after transmission of the last data packet of the group of data packets of the at least one file, a request for the UE to report a reception status of the at least one file; cause the at least one transceiver to transmit, to the UE, one or more repair bits for the at least one file, receive, via the at least one transceiver, an acknowledgment from the UE for the at least one file, and cease transmission of the one or more repair bits upon reception of the acknowledgment from the UE.

In an aspect, a UE includes a memory, at least one transceiver, and at least one processor communicatively coupled to the memory and the at least one transceiver, the at least one processor configured to: receive, from a base station, via the at least one transceiver, at least one file, the at least one file comprising a group of data packets, wherein each data packet of the group of data packets of the at least one file is associated with a file identifier of the at least one file, receive, from the base station, via the at least one transceiver, a request for the UE to report a reception status of the at least one file, receive, from the base station, via the at least one transceiver, one or more repair bits for the at least one file, and cause the at least one transceiver to transmit, to the base station, an acknowledgment for the at least one file.

In an aspect, a non-transitory computer-readable medium storing computer-executable instructions includes computer-executable instructions comprising at least one instruction instructing a network entity to transmit, to a UE, at least one file, the at least one file comprising a group of data packets, wherein each data packet of the group of data packets of the at least one file is associated with a file identifier of the at least one file, at least one instruction instructing the network entity to transmit, to the UE, after transmission of the last data packet of the group of data packets of the at least one file, a request for the UE to report a reception status of the at least one file, at least one instruction instructing the network entity to transmit, to the UE, one or more repair bits for the at least one file, at least one instruction instructing the network entity to receive an acknowledgment from the UE for the at least one file, and at least one instruction instructing the network entity to cease transmission of the one or more repair bits upon reception of the acknowledgment from the UE.

In an aspect, a non-transitory computer-readable medium storing computer-executable instructions includes computer-executable instructions comprising at least one instruction instructing a UE to receive, from a base station, at least one file, the at least one file comprising a group of data packets, wherein each data packet of the group of data packets of the at least one file is associated with a file identifier of the at least one file, at least one instruction instructing the UE to receive, from the base station, a request for the UE to report a reception status of the at least one file, at least one instruction instructing the UE to receive, from the base station, one or more repair bits for the at least one file, and at least one instruction instructing a UE to transmit, to the base station, an acknowledgment for the at least one file.

In an aspect, a network entity includes means for transmitting, to a UE, at least one file, the at least one file comprising a group of data packets, wherein each data packet of the group of data packets of the at least one file is associated with a file identifier of the at least one file, means for transmitting, to the UE, after transmission of the last data packet of the group of data packets of the at least one file, a request for the UE to report a reception status of the at least one file, means for transmitting, to the UE, one or more repair bits for the at least one file, means for receiving an acknowledgment from the UE for the at least one file, and means for ceasing transmission of the one or more repair bits upon reception of the acknowledgment from the UE.

In an aspect, a UE includes means for receiving, from a base station, at least one file, the at least one file comprising a group of data packets, wherein each data packet of the group of data packets of the at least one file is associated with a file identifier of the at least one file, means for receiving, from the base station, a request for the UE to report a reception status of the at least one file, means for receiving, from the base station, one or more repair bits for the at least one file, and means for transmitting, to the base station, an acknowledgment for the at least one file.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
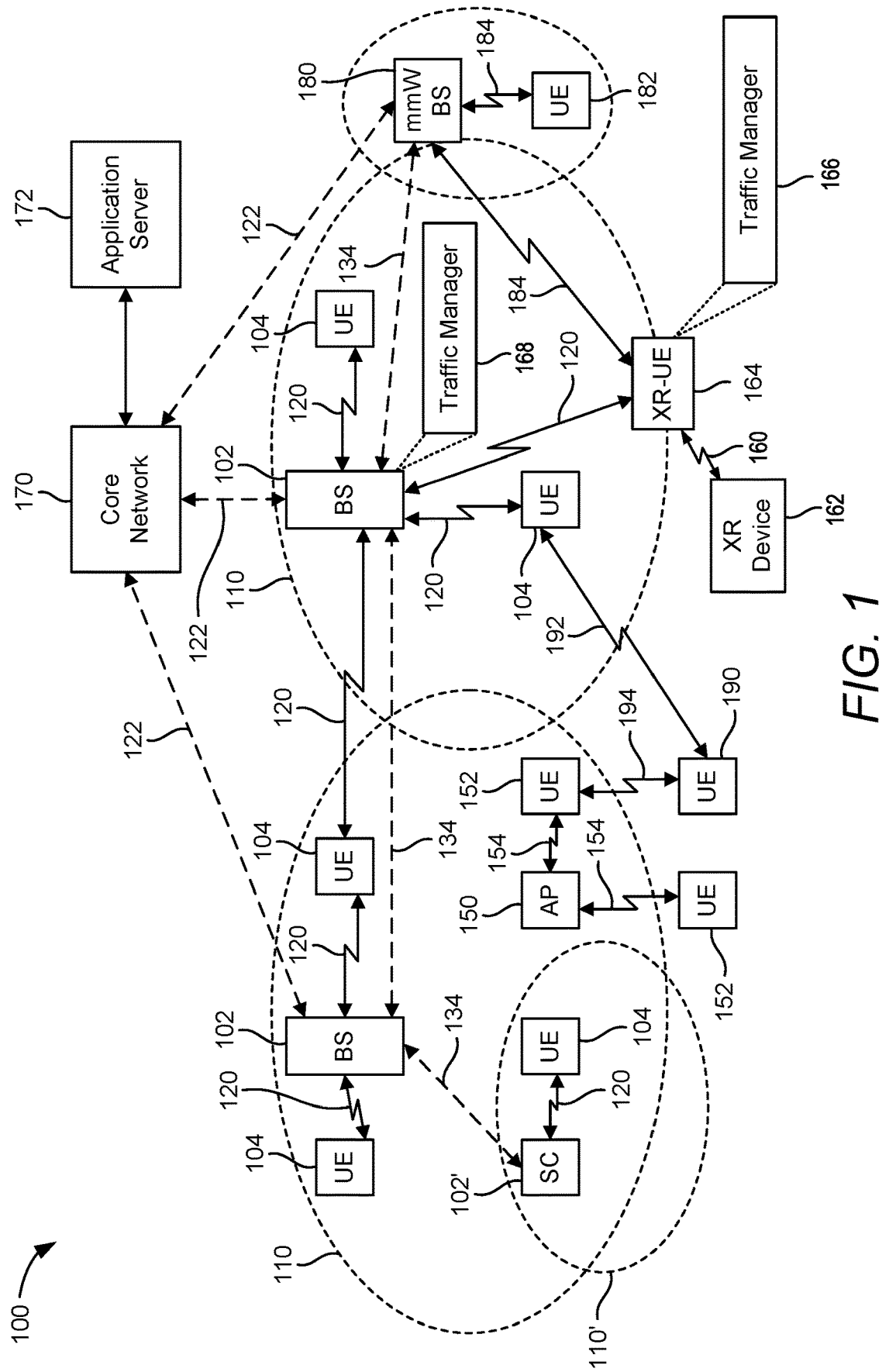
FIG. 1 illustrates an exemplary wireless communications system, according to various aspects.

The present disclosure provides techniques for file-based transmission and retransmission of application files in a 5G system. In an aspect, each packet of a file may include the file identifier of the file in the header field of the packet. After sending the last packet of the file, upon receiving a negative acknowledgment from the UE, the base station can begin retransmission (i.e., transmission of repair bits). The base station may transmit repair bits until the UE acknowledges that it has received the file.

The present disclosure also describes techniques for file deadline-aware downlink scheduling. In an aspect, a base station takes a file's file delay budget (FDB) into consideration when scheduling the downlink file transmissions to the UE. The base station may receive the file identifier at the MAC layer. More specifically, in delivering PDCP protocol data units (PDUs) to the RLC layer, the PDCP layer may indicate the file identifier to the RLC layer. In delivering RLC PDUs to the MAC layer, the RLC layer may indicate the file identifier to the MAC layer.

The present disclosure also describes techniques for burst awareness. In an aspect, when a base station knows that all the files of a burst have been delivered, the base station can send a GTS command to the recipient UE for power saving. The base station may know that all the files of a burst have been delivered based on the burst identifier in the GTP-U headers of the packets of the files of the burst.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more application servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include an extended reality (XR) UE 164 that may communicate with a macro cell base station 102 over a communication link 120 and/or the mmW base station 180 over a mmW communication link 184. For example, the macro cell base station 102 may support a PCell and one or more SCells for the XR UE 164 and the mmW base station 180 may support one or more SCells for the XR UE 164. The XR UE 164 may also communicate with an XR device 162 over a D2D P2P link 160. In an aspect, the XR device 162 may be a VR/AR/MR headset or the like.

In an aspect, the XR UE 164 may include a traffic manager 166 that may enable the XR UE 164 to perform the UE operations described herein. Similarly, the base stations 102 may include a traffic manager 168 that may enable the base stations 102 to perform the base station operations described herein. Note that although only one UE in FIG. 1 is illustrated as an XR UE, any of the UEs in FIG. 1 may be configured to perform the UE operations described herein.

Figure 2:
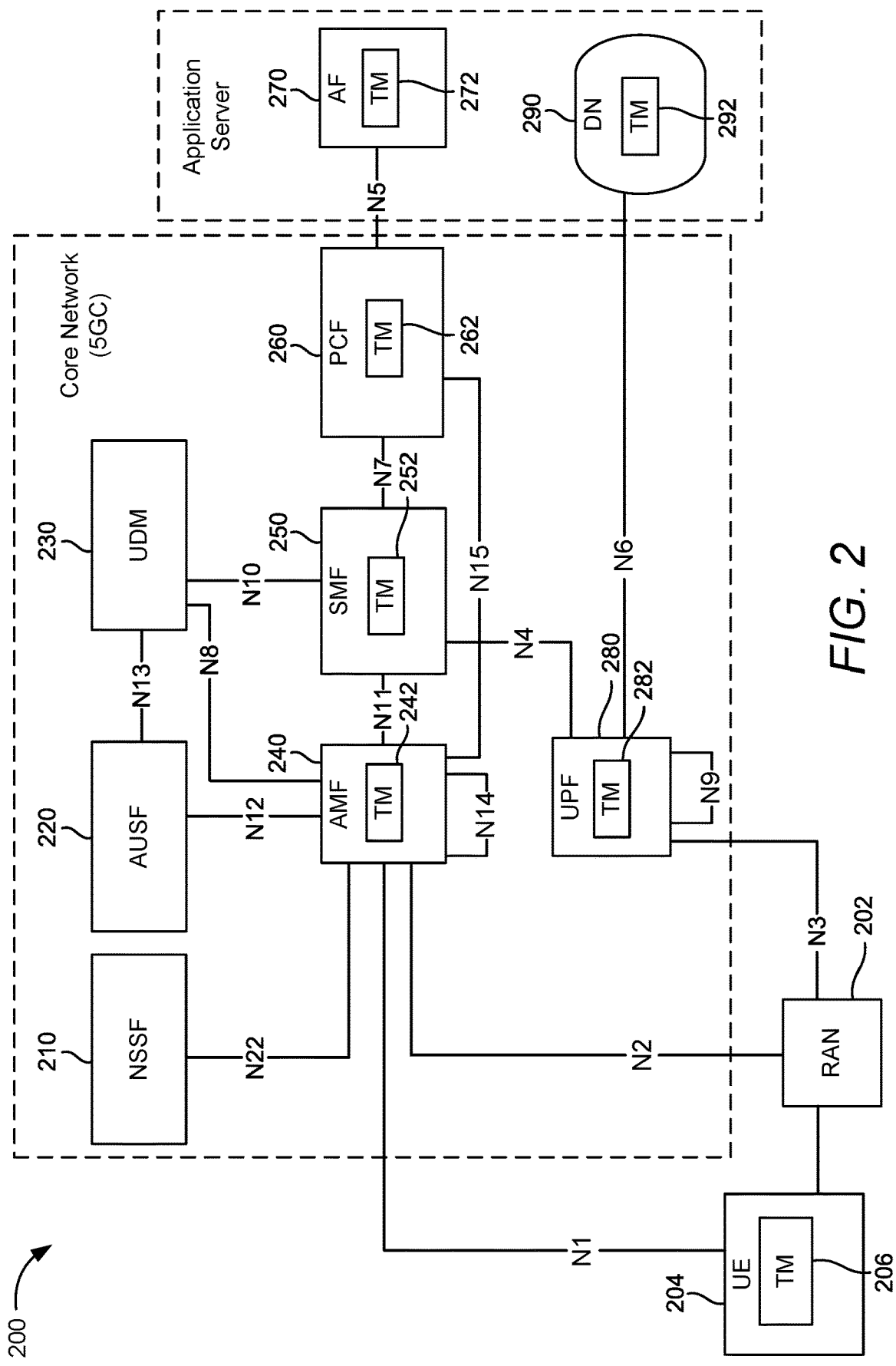
FIG. 2 illustrates an exemplary 5G system architecture using a reference point representation showing how various network functions interact with each other.

FIG. 2 illustrates an exemplary 5G system (5GS) architecture 200 using a reference point representation showing how various network functions interact with each other. The 5GS architecture 200 may include a UE 204 (which may correspond to any of the UEs described herein) in communication with a RAN 202 (which may be formed by any one or more of the base stations described herein) over a wireless air interface. The UE 204 communicates with an access and mobility management function (AMF) 240 via the RAN 202 over an NAS interface referred to as the N1 interface. An AMF 240 may communicate with other AMFs 240 over an interface referred to as the N14 interface.

The functions of an AMF 240 include registration management, connection management, reachability management, mobility management, lawful interception (for AMF 240 events and interface to the LI system), transport for session management (SM) messages between the UE 204 and the session management function (SMF) 250, transparent proxy services for routing SM messages, access authentication and access authorization, transport for short message service (SMS) messages between the UE 204 and the short message service function (SMSF) (not shown), and security anchor functionality (SEAF). The AMF 240 also interacts with the authentication server function (AUSF) 220 and the UE 204, and receives the intermediate key that was established as a result of the UE 204 authentication process. In the case of authentication based on a UMTS (universal mobile telecommunications system) subscriber identity module (USIM), the AMF 240 retrieves the security material from the AUSF 220. The functions of the AMF 240 also include security context management (SCM). The SCM receives a key from the SEAF that it uses to derive access-network specific keys. The functionality of the AMF 240 also includes location services management for regulatory services, transport for location services messages between the UE 204 and the location management function (LMF) (not shown), as well as between the RAN 202 and the LMF, evolved packet system (EPS) bearer identifier allocation for interworking with the EPS, and UE 204 mobility event notification. In addition, the AMF 240 also supports functionalities for non-3GPP access networks.

In addition to communicating with the AMF 240 over the N2 interface, the RAN 202 also communicates with a user plane function (UPF) 280 over an interface referred to as the N3 interface. Functions of the UPF 280 include acting as an anchor point for intra-/inter-RAT mobility (when applicable), acting as an external protocol data unit (PDU) session point of interconnect to the data network (DN) 290, providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node.

The UPF 280 may communicate with other UPFs 280 over an interface referred to as the N9 interface. The interface over which the UPF 280 communicates with a DN 290 is referred to as the N6 interface. The functions of the DN 290 include operator services, Internet access, and other services.

The interface over which the UPF 280 communicates with an SMF 250 is referred to as the N4 interface. The functions of the SMF 250 include session management, UE Internet protocol (IP) address allocation and management, selection and control of user plane functions, configuration of traffic steering at the UPF 280 to route traffic to the proper destination, control of part of policy enforcement and QoS, and downlink data notification. The interface over which the SMF 250 communicates with an AMF 240 is referred to as the N11 interface.

The interface over which the SMF 250 communicates with a policy control function (PCF) 260 is referred to as the N7 interface. The functions of the PCF 260 include support for a unified policy framework to govern network behavior, provision of policy rules to the control plane function(s) to enforce them, and access to subscription information relevant for policy decisions in a unified data repository (UDR) (not shown). The interface over which the PCF 260 communicates with the AMF 240 is referred to as the N15 interface, and the interface over which the PCF 260 communicates with an application function (AF) 270 is referred to as the N5 interface. The functionality of the AF 270 includes application influence on traffic routing, accessing the network exposure function (NEF) (not shown), and interacting with the policy framework for policy control.

The SMF 250 also communicates with a unified data management (UDM) 230 over an interface referred to as the N10 interface. The functions of the UDM 230 include generation of 3GPP authentication and key agreement (AKA) authentication credentials, user identification handling, support of de-concealment of privacy-protected subscription concealed identifier (SUCI), access authorization based on subscription data (e.g., roaming restrictions), UE's 204 serving network function (NF) registration management (e.g., storing the serving AMF 240 for the UE 204, storing the serving SMF 250 for the UE's 204 PDU session), support for service/session continuity (e.g., by keeping the SMF/DNN (data network name) assignment of ongoing sessions), mobile terminated SMS (MT-SMS) delivery support, lawful interception, subscription management, SMS management, 5G local area network (LAN) group management handling, and support of external parameter provisioning (expected UE 204 behavior parameters or network configuration parameters). The interface over which the UDM 230 communicates with the AMF 240 is referred to as the N8 interface.

The interface over which the UDM 230 communicates with the AUSF 220 is referred to as the N13 interface, and the interface over which the AUSF 220 communicates with the AMF 240 is referred to as the N12 interface. The functionality of the AUSF 220 includes support for authentication for 3GPP access and untrusted non-3GPP access.

The AMF 240 also communicates with a network slice selection function (NSSF) 210 over an interface referred to as the N22 interface. The functionality of the NSSF 210 includes selecting the set of network slice instances serving the UE 204, determining the allowed network slice selection assistance information (NSSAI) and, if needed, the mapping to the subscribed S-NSSAIs, determining the configured NSSAI and, if needed, the mapping to the subscribed S-NSSAIs, and determining the AMF set to be used to serve the UE 204, or, based on configuration, a list of candidate AMF(s) 240, possibly by querying the network repository function (NRF) (not shown).

In an aspect, each of the AMF 240, the SMF 250, the PCF 260, the AF 270, the UPF 280, and the DN 290 may include a traffic manager (TM) 242, 252, 262, 272, 282, and 292, respectively, that enable the AMF 240, the SMF 250, the PCF 260, the AF 270, the UPF 280, and the DN 290 to perform the respective operations described herein. Similarly, the UE 204 may include a traffic manager (TM) 206, which may correspond to the traffic manager 166 in FIG. 1, that may enable the UE 204 to perform the UE operations described herein. Similarly, the base stations of the RAN 202 (not shown) may each include a traffic manager, such as traffic manager 168 in FIG. 1, that may enable the base stations to perform the base station operations described herein.

As illustrated by the dashed lines in FIG. 2, the network functions of the AF 270 and the DN 290 make up, or are referred to as, an application server, and may be a specific example of the application server 172 in FIG. 1. The network functions of the NSSF 210, the AUSF 220, the UDM 230, the AMF 240, the SMF 250, the PCF 260, and the UPF 280 make up the core network, referred to in 5G as the 5G core (5GC), and may be a specific example of the core network 170 in FIG. 1. The various network functions illustrated in FIG. 2 may be distributed over separate devices (e.g., servers), or may be logically separated on the same device.

For the sake of clarity, the unstructured data storage function (UDSF), the NEF, and the NRF have not been illustrated. However, all illustrated network functions can interact with the UDSF, UDR, NEF, and NRF as necessary. The UDM 230 uses subscription data and authentication data and the PCF 260 uses policy data that may be stored in the UDR. For clarity, the UDR and its connections with other network functions (e.g., PCF 260) are not illustrated. In addition, for clarity, the network data analytics function (NWDAF) and its connections with other network functions are not illustrated in FIG. 2.

Figure 3:
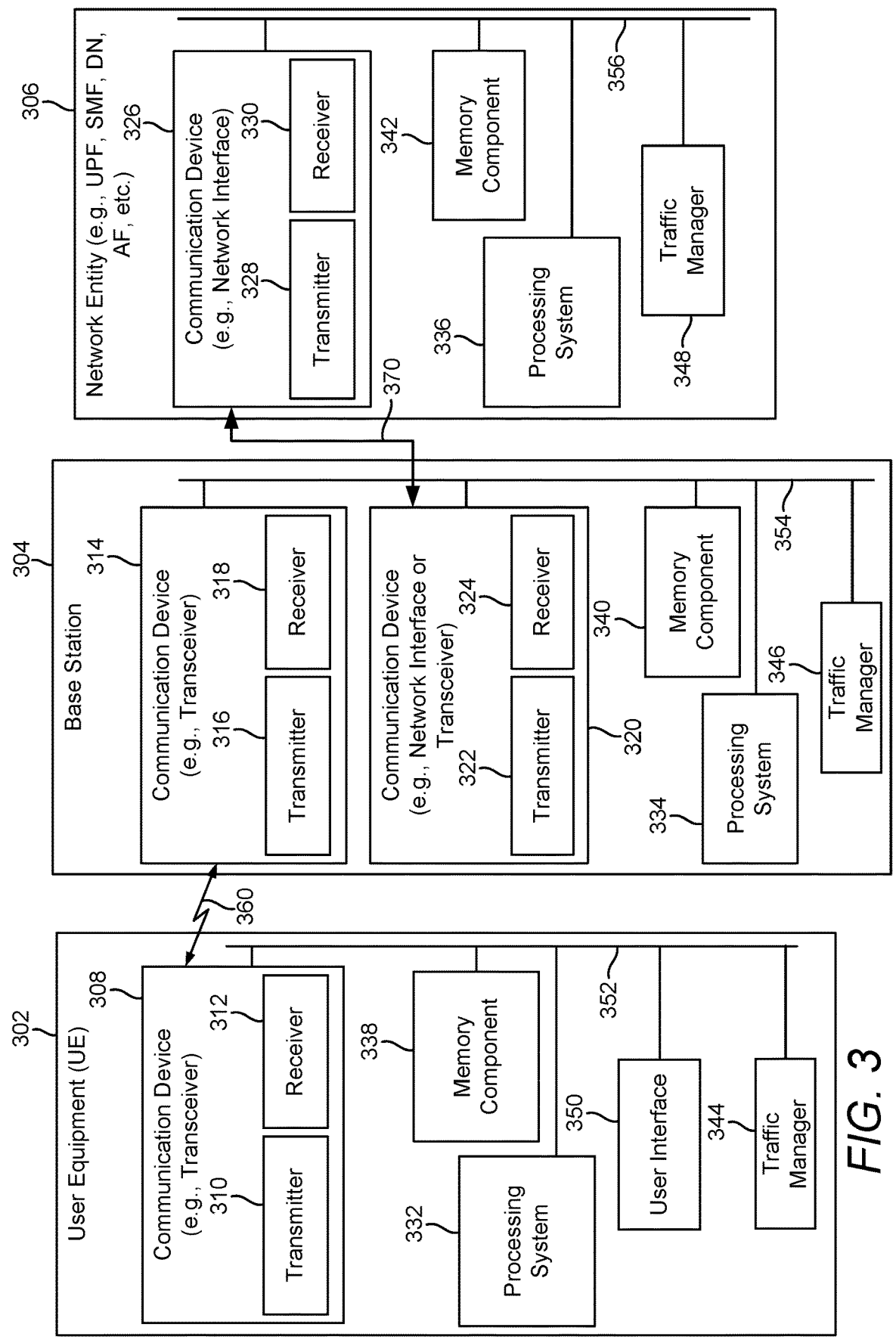
FIG. 3 is a simplified block diagram of several sample aspects of components that may be employed in communication nodes and configured to support communication as taught herein.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on).

If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on). A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370. In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

In an aspect, the apparatuses 302, 304, and 306 may include traffic managers 344, 346, and 348, respectively. The traffic managers 344, 346, and 348 may be hardware circuits that are part of or coupled to the processing systems 332, 334, and 336, respectively, that, when executed, cause the apparatuses 302, 304, and 306 to perform the functionality described herein. Alternatively, the traffic managers 344, 346, and 348 may be memory modules stored in the memory components 338, 340, and 342, respectively, that, when executed by the processing systems 332, 334, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 346 may be implemented by processor and memory component(s) of the base station 304 (e.g., by execution of appropriate code and/or by appropriate configuration of processor components). Also, some or all of the functionality represented by blocks 326, 336, 342, and 348 may be implemented by processor and memory component(s) of the network entity 306 (e.g., by execution of appropriate code and/or by appropriate configuration of processor components).

Extended reality (XR) refers to all real-and-virtual combined environments and human-machine interactions generated by computer technology and wearables. It includes representative forms such as augmented reality (AR), augmented virtuality (AV), mixed reality (MR), and virtual reality (VR) and the areas interpolated among them.

VR is a rendered version of a visual (and optionally, audio) scene. The rendering is designed to mimic the visual (and audio) sensory stimuli of the real world as naturally as possible to an observer or user as they move within the limits defined by the VR application. VR usually, but not necessarily, requires a user to wear a head mounted display (HMD) (an example of XR device 162), to completely replace the user's field of view with a simulated visual component, and to wear headphones, to provide the user with the accompanying audio. Some form of head and motion tracking of the user in VR is usually also necessary to allow the simulated visual and audio components to be updated in order to ensure that, from the user's perspective, items and sound sources remain consistent with the user's movements. Additional means to interact with the virtual reality simulation may be provided but are not strictly necessary.

AR is when a user is provided with additional information or artificially generated items or content that are overlaid upon his or her current environment, usually in the form of a heads-up display (HUD) integrated into a pair of glasses (another example of XR device 162). Such additional information or content will usually be visual and/or audible and the user's observation of the current environment may be direct, with no intermediate sensing, processing, and rendering, or indirect, where the user's perception of the environment is relayed via sensors and may be enhanced or processed.

MR is an advanced form of AR, where some virtual elements are inserted into the physical scene with the intent to provide the illusion that these elements are part of the real scene.

XR refers to all real-and-virtual combined environments and human-machine interactions generated by computer technology and wearables. It includes representative forms, such as AR, MR, and VR, and the areas interpolated among them. The levels of virtuality range from partial sensory inputs to fully immersive VR. A key aspect of XR is the extension of human experiences, especially relating to the senses of existence (represented by VR) and the acquisition of cognition (represented by AR).

There are a number of challenges to designing and building XR devices. One of these challenges is connectivity. XR devices need to provide ubiquitous, wireless connectivity for anywhere usage at fiber-optic speeds. This type of high data rate and low latency network connectivity can now be achieved over cellular networks, due to the increased speeds and reduced latency offered by 5G networks.

For example, 5G networks allow for extremely high throughput (e.g., multi Gbps), ultra-low latency (e.g., down to 1 ms), and a uniform experience, even at the cell edge. Video is expected to be the primary use case for 5G connectivity. Current LTE networks can provide a throughput of approximately 10 to 50 Mbps, which allows for up to 360°, 4K resolution, 30 frames per second (fps) video. In contrast, 5G networks will be able to provide a throughput of approximately 200 to 5000 Mbps with very low latency, which can allow for interactive, real-time three-dimensional (3D) "free-viewpoint" (i.e., six degrees of freedom (6-DoF)), 8K resolution, 90-120 fps, high-dynamic-range (HDR) video.

5G QoS indicators (5QI) have been specified for services that are assumed to be frequently used and thus benefit from optimized signaling by using standardized QoS characteristics. Dynamically assigned 5QI values (which require a signaling of QoS characteristics as part of the QoS profile) can be used for services for which standardized 5QI values are not defined. Some of the one-to-one mappings of standardized 5QI values to 5G QoS characteristics are specified in Table 1.

TABLE 1

| 5QI Value | Packet Delay Budget (PDB) | Packet Error Rate (PER) | Default Maximum Data Burst Volume | Example Services |
|---|---|---|---|---|
| 1 | 100 ms | $10^{-2}$ | N/A | Conversational Voice |
| 2 | 150 ms | $10^{-3}$ | N/A | Conversational Video (Live Streaming) |
| 6, 8, 9 | 300 ms | $10^{-6}$ | N/A | Video (Buffered Streaming) TCP-based (e.g., www, e-mail, chat, ftp, P2P file sharing, progressive video, etc.) |
| ... | ... | ... | ... | ... |
| 80 | 10 ms | $10^{-6}$ | N/A | Low Latency eMBB applications Augmented Reality |
| 81 | 5 ms | $10^{-5}$ | 160 B | Remote control |
| ... | ... | ... | ... | ... |

XR applications require a high bit rate, high reliability (e.g., a PER less than or equal to $10^{-3}$), and low latency (e.g., a PDB between 5 ms and 25 ms) wireless connectivity. As such, XR applications would benefit from a 5QI of 80 or higher.

Table 2 illustrates exemplary XR use cases that would require high bit rate, high reliability, and low latency connectivity:

TABLE 2

| | Cloud Gaming | VR split rendering | AR split computation |
|---|---|---|---|
| HMD/Device | 5 G Smartphone or Tablet | Head-mounted with 5 G modem attached | Head-mounted with USB/Bluetooth connection to "puck" or Smartphone with 5 G modem. Low power (2 W) AR glasses |
| 5 G usage | QoS/Over the Top (OTT) | QoS | QoS |
| Location | Outdoor | Enterprise-Indoor, Residential-Indoor, Outdoor | Enterprise-Indoor, Outdoor |
| Mobility | Static, Hi-speed | Limited to head movements and restricted body movements, Hi-speed (VR in a train, back of a car) | Pedestrian, Hi-speed |

Figure 4:
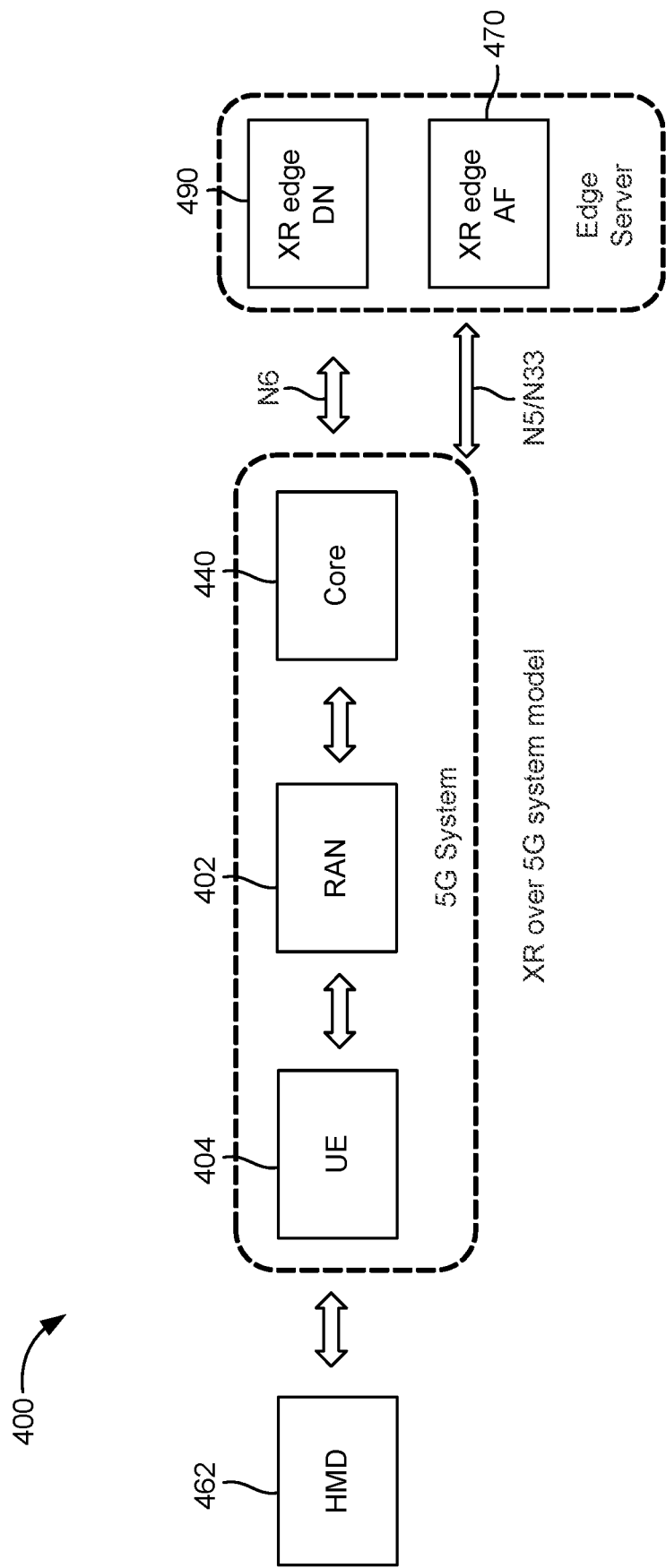
FIG. 4 illustrates an exemplary XR over 5G system model, according to aspects of the disclosure.

FIG. 4 illustrates an exemplary XR-over-5G system model 400, according to aspects of the disclosure. The system 400 includes an HMD 462 in communication with a UE 404 over a wired or wireless link. The UE 404 is connected to a RAN 402 (which may correspond to RAN 202 in FIG. 2), which is connected to a core network 440 (which may correspond to the core network illustrated in FIG. 2). The core network 440 is connected to an XR edge DN 490 (which may correspond to the DN 290 in FIG. 2) over an N6 interface (the interface between a UPF and a DN). The core network 440 is also connected to an XR edge AF 470 (which may correspond to the AF 270 in FIG. 2) over network external interfaces referred to as the N5 and N33 interfaces.

The present disclosure makes certain assumptions about an XR-over-5G system, such as system 400. One assumption is that the 5GS provides QoS (it is not "over the top"). Another is that the XR application session is hosted at the edge server (i.e., the XR edge DN 490 and the XR edge AF 470). Yet another is that the latency between the core network 440 and the XR edge server is assumed to be negligible. Another assumption is that the transport layer over the N6 interface will utilize the real-time transport protocol (RTP) at the application layer and the user datagram protocol (UDP) at the transport layer. It is also assumed that use of the hypertext transfer protocol (HTTP) at the application layer and of the transmission control protocol (TCP) at the transport layer will cut into the latency budget. There is no assumption, however, about the ownership of the edge server—it could be owned by the network operator or a third party.

An issue with transporting XR application traffic over a 5G network is that XR applications specify the requirements for files rather than packets. Specifically, XR applications specify the file error rate (FER) and/or the file delay budget (FDB). In addition, the file handling policy may specify that a file can be used only if all packets of a file are received, or that a contiguous stream of packets up to the first packet in error can be used. However, cellular data networks, including 5G systems, are only aware of packet requirements via the packet error rate (PER) and the packet delay budget (PDB). This includes transmission and retransmission schemes, which are performed at the packet level, not the file level. Accordingly, the present disclosure provides techniques for file-based transmission and retransmission of application files in a 5G system. The disclosed techniques are also applicable to packet group-based transmission and retransmission.

Note that a file is a set of one or more data packets (e.g., RLC PDUs, PDCP PDUs) that is jointly processed by an application, such as an XR application. A file is broken into IP packets depending on the maximum transmission unit (MTU) settings on the IP stack interfacing with the XR application. The IP packets can be fragmented into IP packet fragments.

Figure 5:
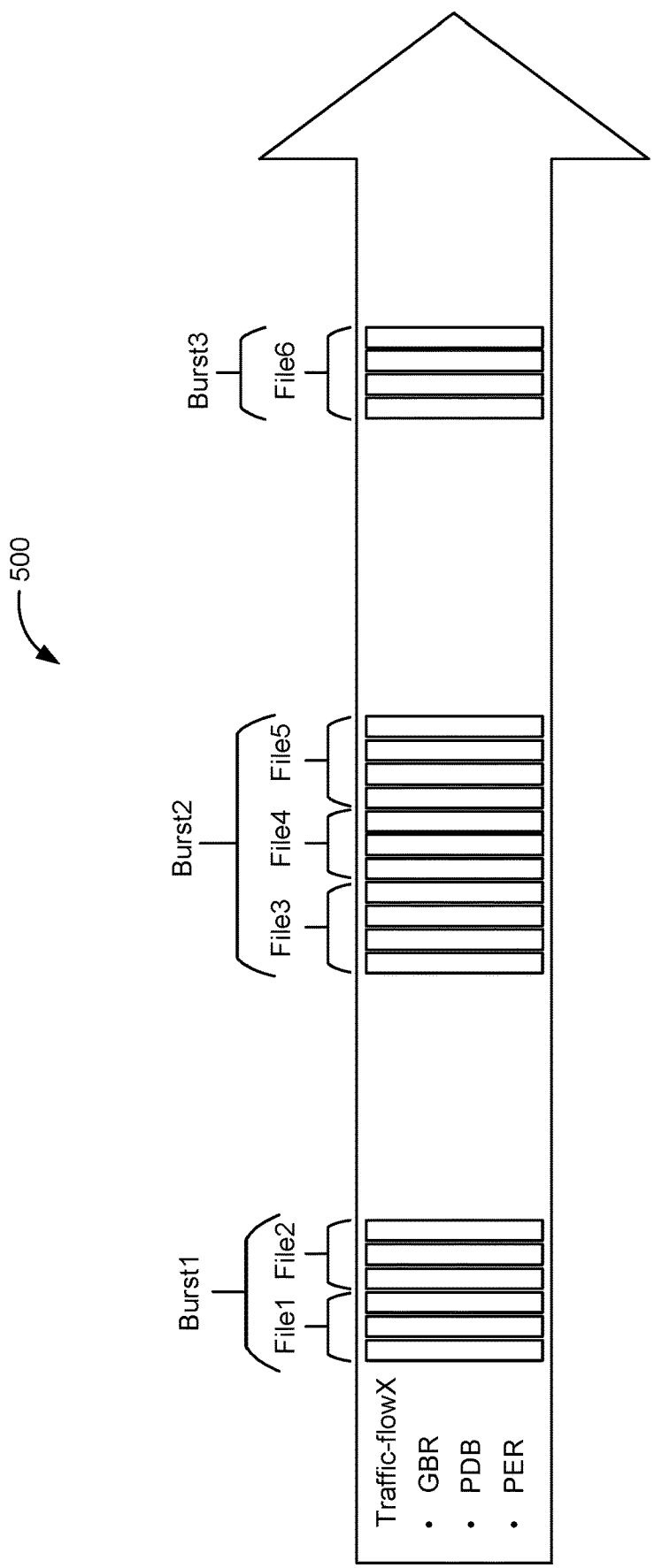
FIG. 5 illustrates an exemplary data flow, according to aspects of the disclosure.

FIG. 5 illustrates an exemplary data flow 500, according to aspects of the disclosure. As shown in FIG. 5, the data flow 500 includes a plurality of bursts of files (labeled "Burst1," "Burst2," and "Burst3"), each comprising one or more files destined for an XR application (labeled "File1" to "File6"). Each file is comprised of one or more packets (three or four in the example of FIG. 5).

Packets for XR application files are typically carried over UDP and radio link control unacknowledged mode (RLC-UM), as this is more efficient than using RLC-AM (acknowledge mode). Because XR applications specify the requirements for files rather than packets, file level retransmission is important to ensure the service quality for the XR application.

Figure 6:
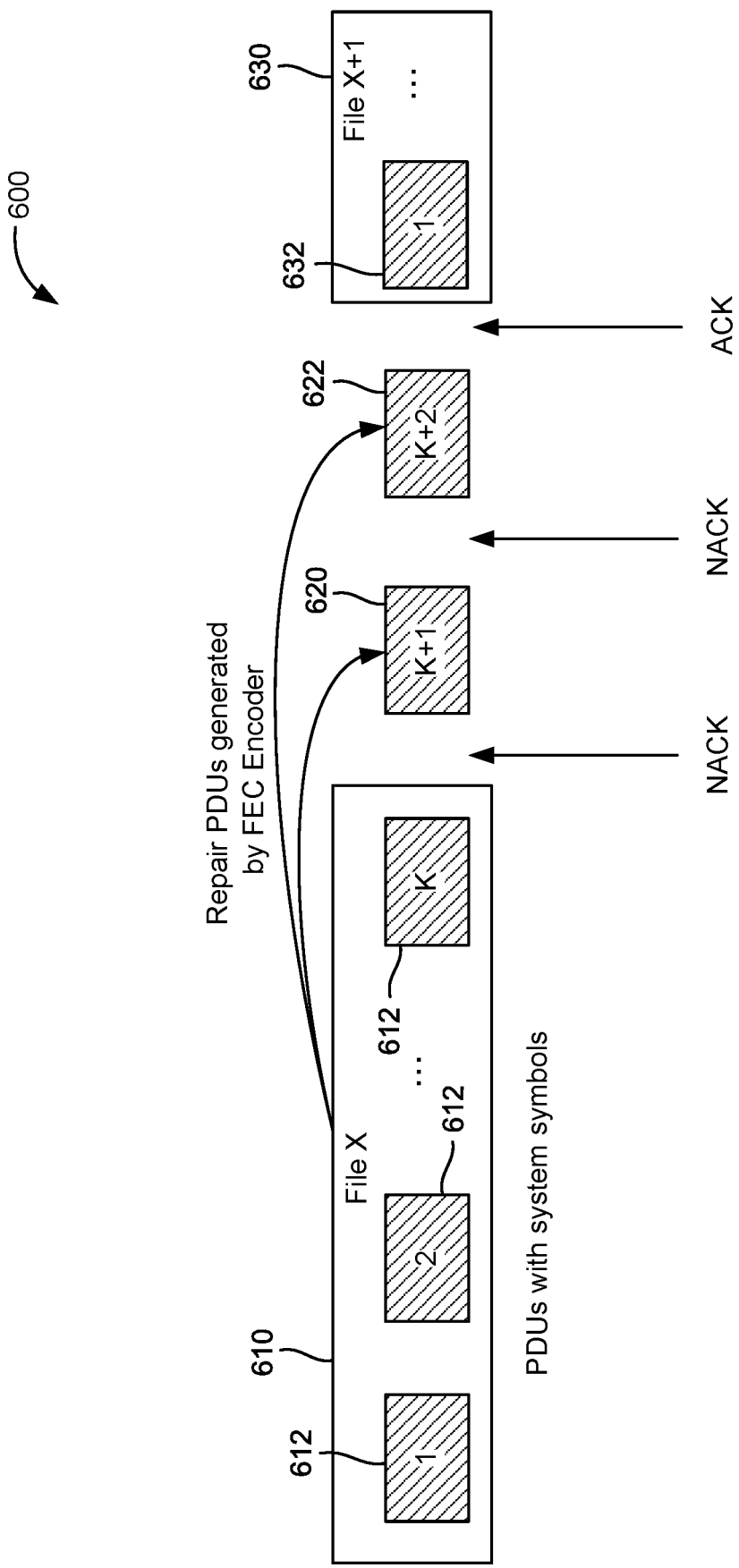
FIG. 6 illustrates an exemplary file transmission procedure, according to aspects of the disclosure.

FIG. 6 illustrates an exemplary file transmission procedure, according to aspects of the disclosure. In the example of FIG. 6, a base station (e.g., any of the base stations described herein) first transmits the original one to 'K' data packets 612 (e.g., RLC PDUs, PDCP PDUs) of an XR application file 610 to a UE (e.g., any of the UEs described herein). Each data packet 612 includes the file identifier of the file 610 in the header field of the data packet 612. The data packets 612 may be PDUs with system symbols.

When sending the last data packet 612 of the file 610, the base station can poll the UE to report the downlink reception status of the file 610. This polling can also be used to indicate to the UE the end of the file 610. The base station may identify the last data packet 612 of the file 610 either by receiving an indication from the application server (e.g., DN 290) via the UPF (e.g., UPF 280) or by implementation (e.g., if no data packet 612 of the file 610 is received in the last 'n' seconds, it means the last received data packet 612 was the last data packet 612 of the file 610).

Alternatively, rather than the base station polling the UE for feedback, the UE may be configured to identify the last data packet 612 of the file 610 similarly to the base station. More specifically, after reception of each data packet 612, the UE resets a timer. If no data packet 612 of the file 610 is received from the base station before expiration of the timer, it means that the last received data packet 612 was the last data packet 612 of the file 610. In that case, after expiration of the timer, the UE can transmit an acknowledgment (ACK) or a negative acknowledgment (NACK) for the file 610, as appropriate.

After receiving a NACK from the UE, whether based on polling the UE or the expiration of the UE's timer, the base station can begin retransmission (i.e., transmission of repair bits, e.g., repair packets 620 and 622). The repair packets 620 and 622 may be PDUs generated by a forward error correction (FEC) encoder (e.g., using a fountain code or a block code). The base station may transmit repair bits until the UE acknowledges that it has received the file 610. In an aspect, if lower latency is preferred, after the original data packets 612 are transmitted, the base station can transmit repair bits until an acknowledgment is received from the UE. Alternatively, if power and/or efficiency is preferred, the base station can transmit repair bits only when it receives a NACK from the UE. In the example of FIG. 6, the base station receives a NACK after polling the UE and therefore transmits a first repair packet 620 (numbered K+1). The base station again receives a NACK, and therefore transmits a second repair packet 622 (numbered K+2). After transmitting the second repair packet 622, however, the base station receives an ACK, and therefore transmits the first packet 632 of the next file (e.g., file 630).

The base station may configure the FEC algorithm with the UE via RRC signaling. The base station may also negotiate with the UE as to whether it should transmit repair bits until it receives an ACK, or whether it should only transmit repair bits if it receives a NACK. For example, the UE may request one of these configurations depending on whether lower latency or power and/or efficiency is preferred. Or the base station may simply inform the UE of which it is applying.

As noted above, the disclosed retransmission technique is also applicable to packet group-based transmission/retransmission, by simply replacing the file identifier in the packet header with the packet group identifier.

Figure 7:
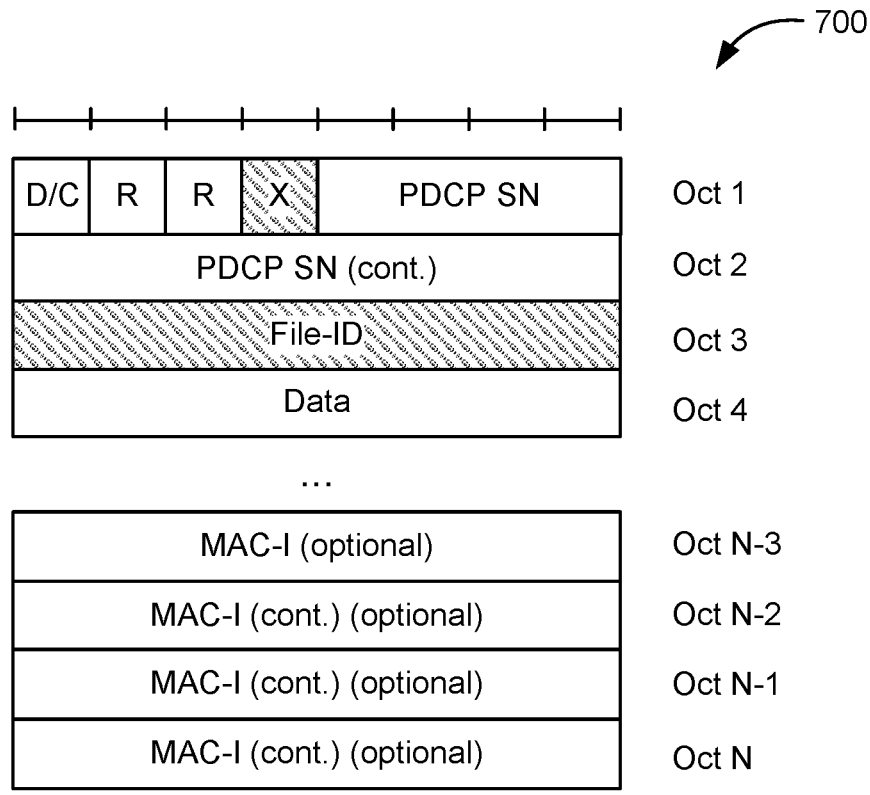
FIG. 7 illustrates an exemplary packet data convergence protocol (PDCP) layer packet, according to aspects of the disclosure.

There are various ways the file identifier and polling bit(s) can be included in a packet header, depending on the type of packet. FIG. 7 illustrates an exemplary PDCP PDU 700, according to aspects of the disclosure. The PDCP PDU 700 may be one of the packets of a file, such as the packets illustrated in FIG. 5 making up the files "File1" to "File6." To identify the associated file, the header of the PDCP PDU 700 may include a file identifier in the third octet. Alternatively, the base station may send a PDCP Control PDU, before sending any of the packets of the file, with the file identifier and the range of the PDCP sequence numbers (SN) of the packets of the file.

In order to poll the UE, the base station may use one of the "R" (reserved) bits in the header of the last PDCP Data PDU (i.e., the last packet of the file), as shown in FIG. 7 by an "X." Alternatively, the base station may send a PDCP Control PDU after the last packet that indicates the end of the file.

The UE may send feedback (e.g., ACK or NACK for a particular file) to the base station in one of several ways. In an aspect, the UE may reuse a PDCP Status Report message. More specifically, the UE would be allowed to send a PDCP Status Report message to the base station for data radio bearers (DRBs) with RLC modes other than RLC-AM mode. Alternatively, a new PDCP Control PDU may be defined that carries an ACK or NACK and the file identifier. As yet another alternative, the UE may send uplink control information (UCI) to ACK or NACK a file, which can reduce the uplink feedback delay.

Figure 8:
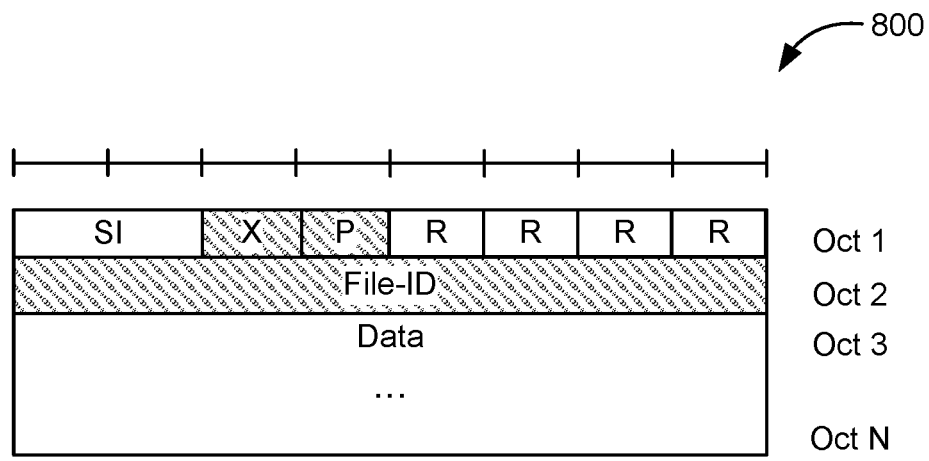
FIG. 8 illustrates an exemplary radio link control (RLC) layer packet, according to aspects of the disclosure.

Another way that the file identifier and polling bit(s) can be included in a packet header is illustrated in FIG. 8. FIG. 8 illustrates an exemplary RLC PDU 800, according to aspects of the disclosure. The RLC PDU 800 may be one of the packets of a file, such as the packets illustrated in FIG. 5 making up the files "File1" to "File6." The present disclosure proposes a new RLC mode that combines RLC-UM and file retransmission, referred to herein as "RLC-FM" or "enhanced RLC-UM." In this mode, the PDCP layer delivers the file identifier information to the RLC layer together with the PDCP PDU. To identify the file, the header of the RLC PDU 800 may include a file identifier in the second octet. Alternatively, the base station may send an RLC Control PDU, before sending any of the packets of the file, with the file identifier and the range of the RLC SNs of the packets of the file.

In order to poll the UE, the base station may use one of the "R" bits in the header of the last RLC Data PDU (i.e., the last packet of the file), as shown in FIG. 8 by a "P." Alternatively, the base station may send an RLC Control PDU after the last packet that indicates the end of the file.

The UE may send feedback (e.g., ACK or NACK for a particular file) to the base station in one of several ways. In an aspect, the UE may reuse an RLC Status PDU. More specifically, the UE would be allowed to send RLC Status PDUs for RLC modes other than RLC-AM mode. Alternatively, a new RLC Control PDU can be defined that carries an ACK or NACK and the file identifier.

Figure 9:
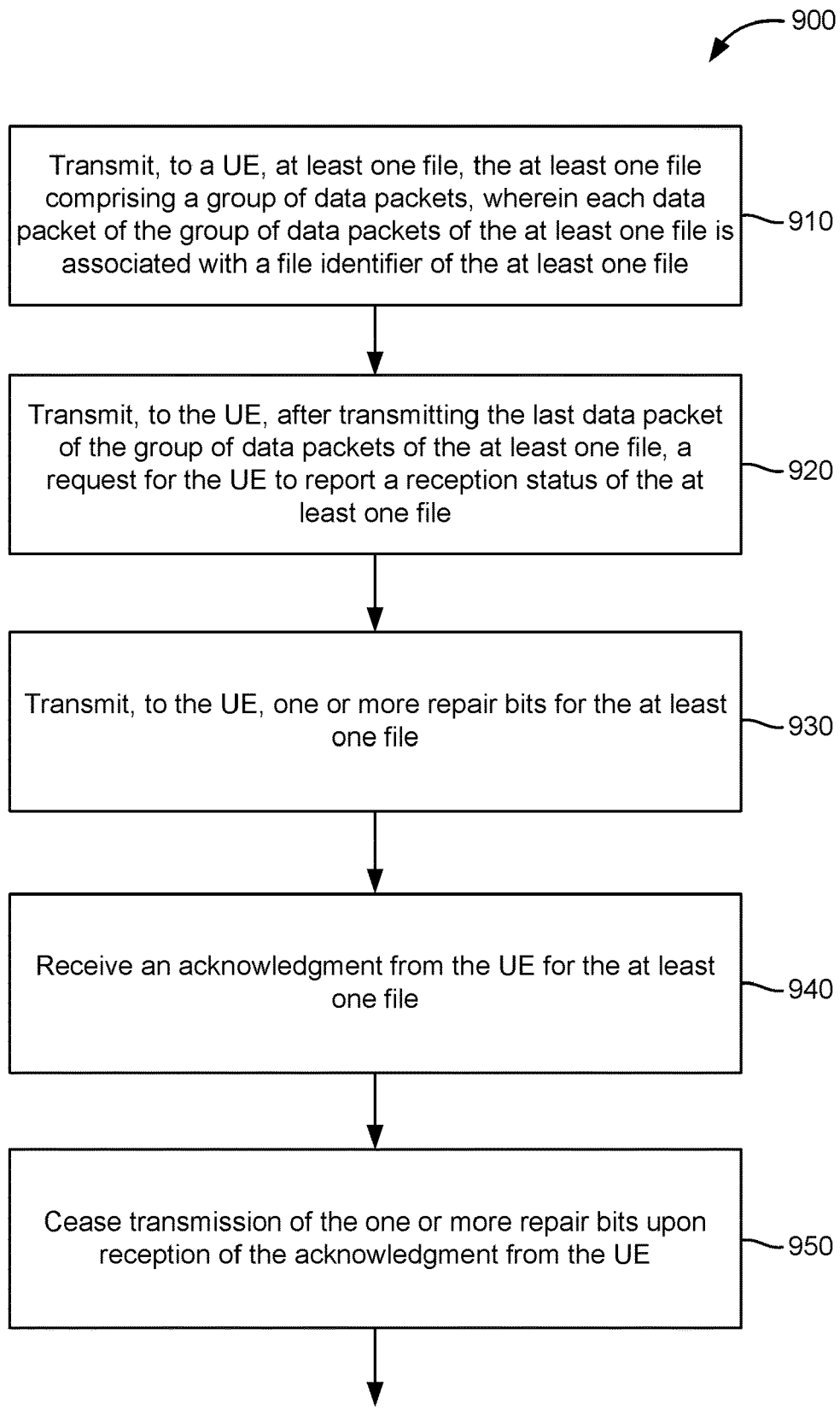
FIGS. 9 and 10 illustrate exemplary methods for wireless communication, according to aspects of the disclosure.

FIG. 9 illustrates an exemplary method 900 of file-based downlink transmission and retransmission, according to aspects of the disclosure. The method 900 may be performed by a network entity, such as any of the base stations described herein.

At 910, the network entity transmits, to a UE (e.g., any of the UEs described herein), at least one file, the at least one file comprising a group of data packets (e.g., one or more RLC PDUs or PDCP PDUs), wherein each data packet of the group of data packets of the at least one file is associated with a file identifier of the at least one file. In an aspect, the at least one file may be destined for an XR application associated with the UE. In an aspect, the XR application may be running on an XR device separate from the UE, such as a VR headset or AR glasses. In an aspect, the XR application may be running on the UE, and the UE may be a handheld touchscreen device. In an aspect, operation 910 may be performed by communication device 314, transmitter 316, processing system 334, memory component 340, and/or traffic manager 346, any or all of which may be considered means for performing this operation.

At 920, the network entity transmits, to the UE, after transmitting the last data packet of the group of data packets of the at least one file, a request for the UE to report a reception status of the at least one file. In an aspect, the method 900 may further include (not shown) receiving, from a UPF (e.g., UPF 280) over the N3 interface, an indication of which data packet of the group of data packets of the at least one file is the last data packet of the group of data packets of the at least one file. Alternatively, in an aspect, the method 900 may further include (not shown) identifying the last data packet of the group of data packets of the at least one file based on not receiving any data packets of the at least one file after a threshold period of time. In an aspect, the request for the UE to report the reception status of the at least one file may be a bit in a header of the last data packet of the group of data packets of the at least one file. In an aspect, the request for the UE to report the reception status of the at least one file may be a control packet transmitted to the UE after the last data packet of the group of data packets of the at least one file. In an aspect, operation 920 may be performed by communication device 314, transmitter 316, processing system 334, memory component 340, and/or traffic manager 346, any or all of which may be considered means for performing this operation.

At 930, the network entity transmits, to the UE, one or more repair bits for the at least one file. In an aspect, the one or more repair bits may be generated by an FEC encoder, which may utilize a fountain code or a block code. In an aspect, the group of data packets of the at least one file and the one or more repair bits may be PDCP layer packets. In an aspect, the group of data packets of the at least one file and the one or more repair bits may be RLC layer packets. In an aspect, operation 930 may be performed by communication device 314, transmitter 316, processing system 334, memory component 340, and/or traffic manager 346, any or all of which may be considered means for performing this operation.

At 940, the network entity receives an acknowledgment from the UE for the at least one file. In an aspect, the network entity may transmit the one or more repair bits only based on reception of a negative acknowledgment from the UE prior to the acknowledgment from the UE. In an aspect, the acknowledgment from the UE may be a PDCP status report message. In an aspect, the acknowledgment from the UE comprises an RLC status PDU. In an aspect, the acknowledgment from the UE comprises a control packet that includes the acknowledgment and the file identifier. In an aspect, the acknowledgment from the UE comprises an UCI message. In an aspect, operation 940 may be performed by communication device 314, receiver 318, processing system 334, memory component 340, and/or traffic manager 346, any or all of which may be considered means for performing this operation.

At 950, the network entity ceases transmission of the one or more repair bits upon reception of the acknowledgment from the UE. In an aspect, the network entity may automatically transmit the one or more repair bits until the acknowledgement is received from the UE. In an aspect, operation 950 may be performed by communication device 314, transmitter 316, processing system 334, memory component 340, and/or traffic manager 346, any or all of which may be considered means for performing this operation.

Figure 10:
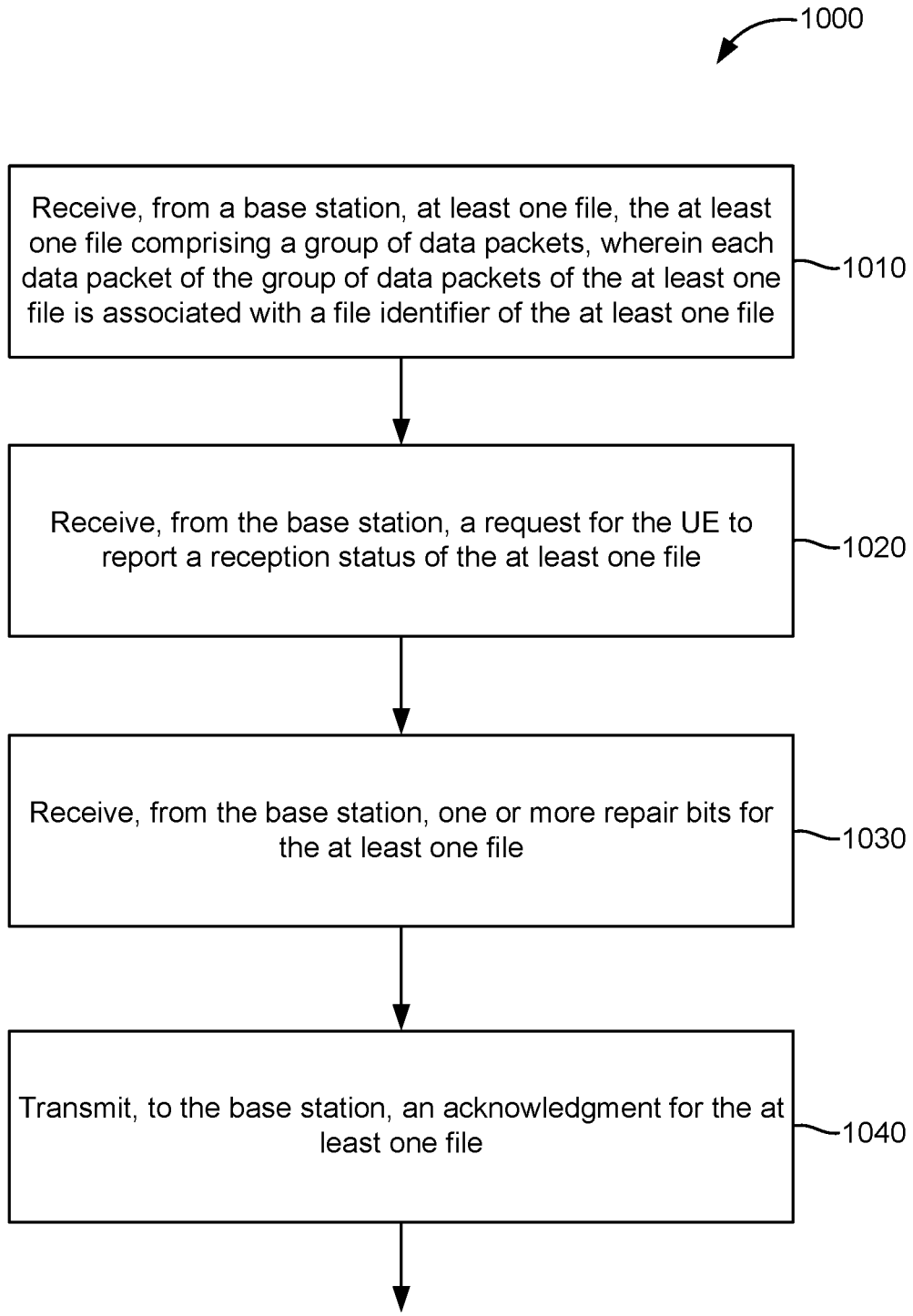

FIG. 10 illustrates an exemplary method 1000 of file-based downlink transmission and retransmission, according to aspects of the disclosure. In an aspect, the method 1000 may be performed by a UE, such as any of the UEs described herein.

At 1010, the UE receives, from a base station (e.g., any of the base stations described herein), at least one file, the at least one file comprising a group of data packets (e.g., one or more RLC PDUs or PDCP PDUs), wherein each data packet of the group of data packets of the at least one file is associated with a file identifier of the at least one file. In an aspect, the at least one file may be destined for an XR application associated with the UE. In an aspect, the XR application may be running on an XR device separate from the UE, such as a VR headset or AR glasses. In an aspect, the XR application may run on the UE, and the UE may be a handheld touchscreen device. In an aspect, operation 1010 may be performed by communication device 308, receiver 312, processing system 332, memory component 338, and/or traffic manager 344, any or all of which may be considered means for performing this operation.

At 1020, the UE (e.g., receiver 312) receives, from the base station, a request for the UE to report a reception status of the at least one file. In an aspect, the request for the UE to report the reception status of the at least one file may be a bit in a header of the last data packet of the group of data packets of the at least one file. In an aspect, the request for the UE to report the reception status of the at least one file may be a control packet received at the UE after the last data packet of the group of data packets of the at least one file. In an aspect, operation 1020 may be performed by communication device 308, receiver 312, processing system 332, memory component 338, and/or traffic manager 344, any or all of which may be considered means for performing this operation.

At 1030, the UE (e.g., receiver 312) receives, from the base station, one or more repair bits for the at least one file. In an aspect, the one or more repair bits may be generated by an FEC encoder that utilizes a fountain code or a block code. In an aspect, the group of data packets of the at least one file and the one or more repair bits may be PDCP layer packets. In an aspect, the group of data packets of the at least one file and the one or more repair bits may be RLC layer packets. In an aspect, operation 1030 may be performed by communication device 308, receiver 312, processing system 332, memory component 338, and/or traffic manager 344, any or all of which may be considered means for performing this operation.

At 1040, the UE (e.g., transmitter 310) transmits, to the base station, an acknowledgment for the at least one file. In an aspect, the acknowledgment may be a PDCP status report message. In an aspect, the acknowledgment may be an RLC status PDU. In an aspect, the acknowledgment may be a control packet that includes the acknowledgment and the file identifier. In an aspect, the acknowledgment may be an UCI message. In an aspect, operation 1040 may be performed by communication device 308, receiver 312, processing system 332, memory component 338, and/or traffic manager 344, any or all of which may be considered means for performing this operation.

Figure 11:
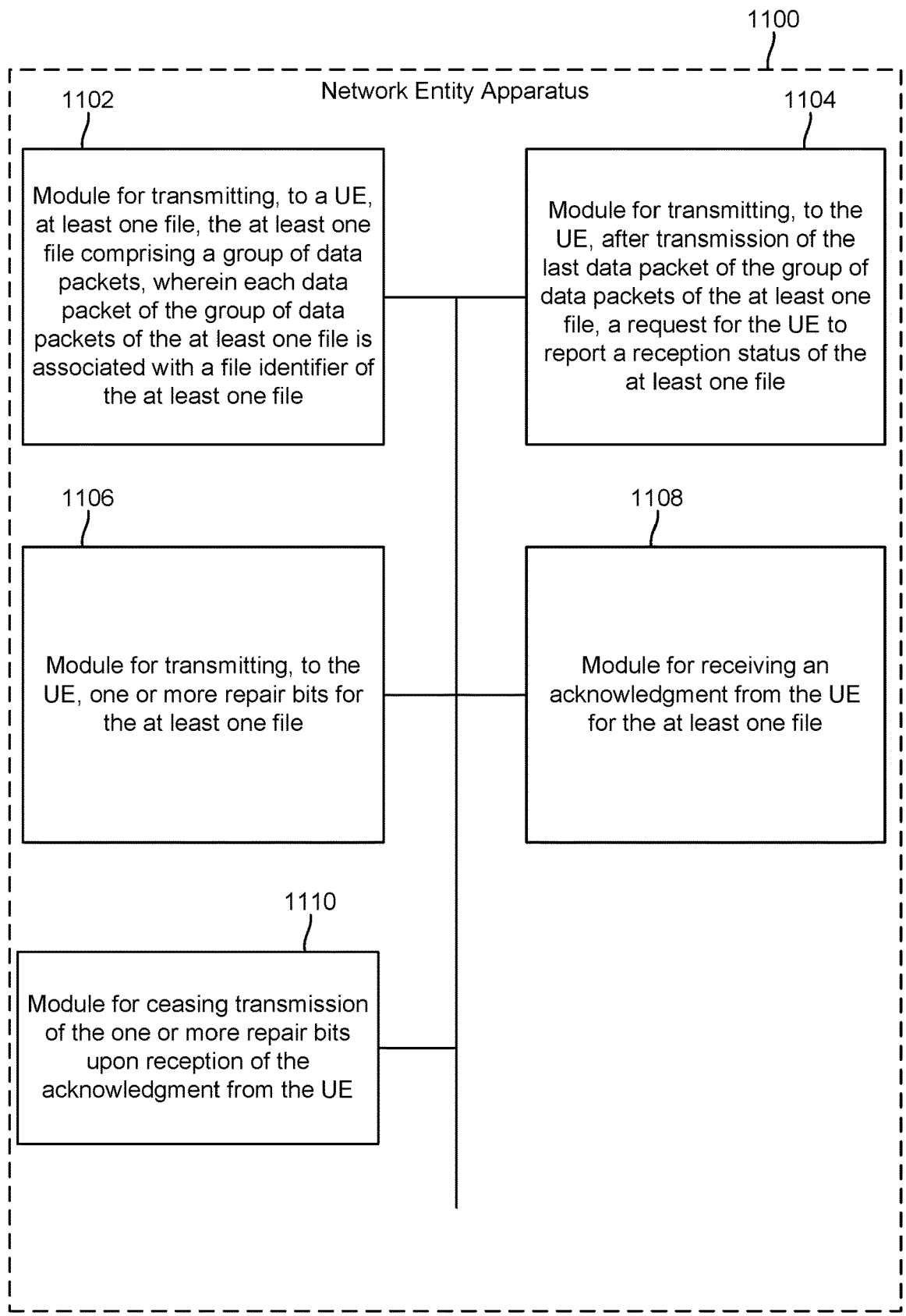
FIGS. 11 and 12 are other simplified block diagrams of several sample aspects of apparatuses configured to support communication as taught herein.

FIG. 11 illustrates an example base station apparatus 1100 represented as a series of interrelated functional modules. A module for transmitting 1102 may correspond at least in some aspects to, for example, a communication device, such as transmitter 316, as discussed herein. A module for transmitting 1104 may correspond at least in some aspects to, for example, a communication device, such as transmitter 316, as discussed herein. A module for transmitting 1106 may correspond at least in some aspects to, for example, a communication device, such as transmitter 316, as discussed herein. A module for receiving 1108 may correspond at least in some aspects to, for example, a communication device, such as receiver 318, as discussed herein. A module for ceasing 1110 may correspond at least in some aspects to, for example, a communication device, such as transmitter 316, as discussed herein.

Figure 12:
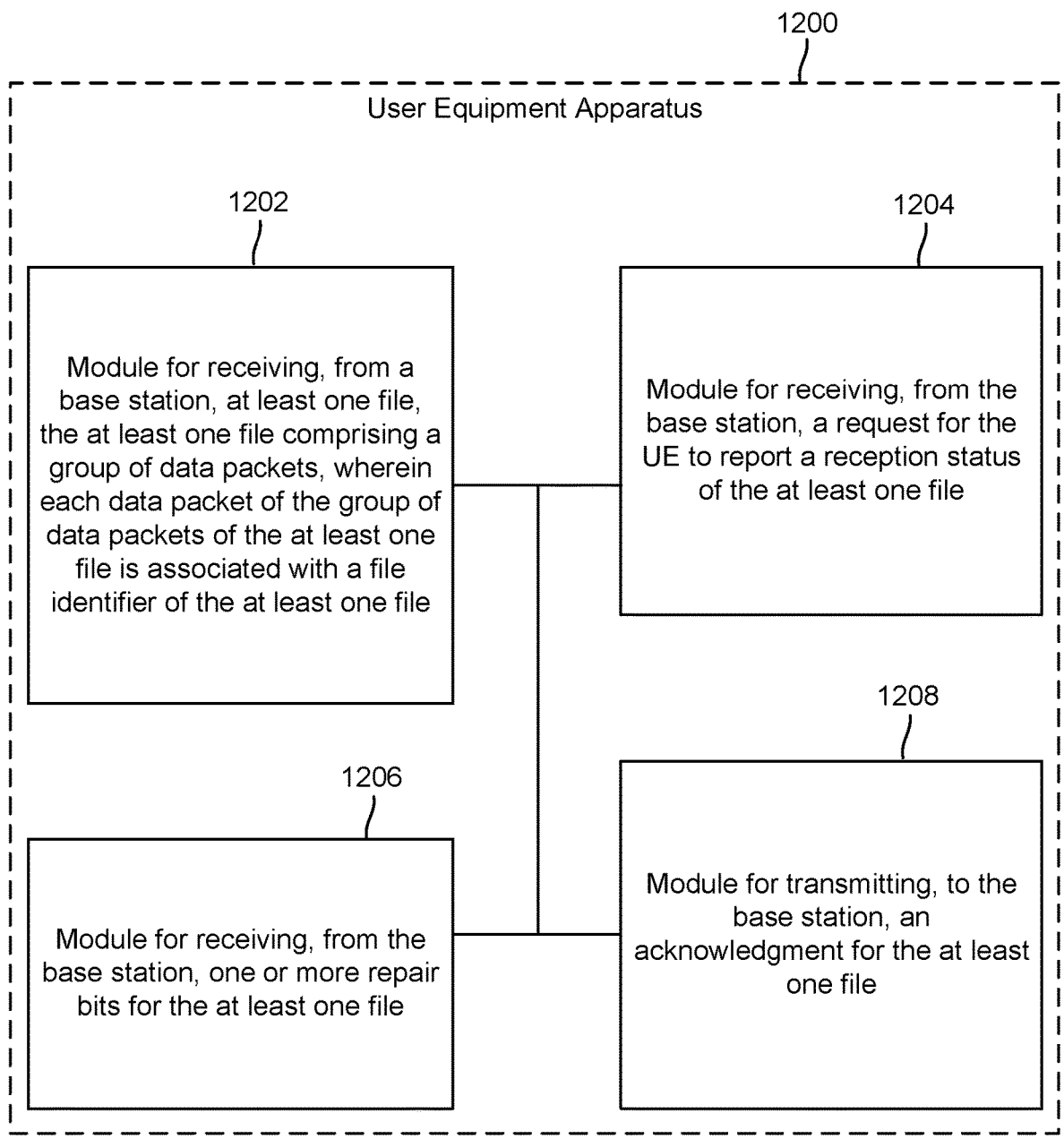

FIG. 12 illustrates an example user device apparatus 1200 represented as a series of interrelated functional modules. A module for receiving 1202 may correspond at least in some aspects to, for example, a communication device, such as receiver 312, as discussed herein. A module for receiving 1204 may correspond at least in some aspects to, for example, a communication device, such as receiver 312, as discussed herein. A module for receiving 1206 may correspond at least in some aspects to, for example, a communication device, such as receiver 312, as discussed herein. A module for transmitting 1208 may correspond at least in some aspects to, for example, a communication device, such as transmitter 316, as discussed herein.

The functionality of the modules of FIGS. 11-12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 11-12, as well as other components and functions described herein, may be implemented using any suitable means. Such means also may be implemented, at least in part, using corresponding structure as taught herein. For example, the components described above in conjunction with the "module for" components of FIGS. 11-12 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying methods for file transmission management at the 5G system.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communication performed by a network entity, comprising:
   transmitting, to a user equipment (UE), at least one file via an unacknowledged mode radio link, the at least one file comprising a group of data packets, wherein each data packet of the group of data packets of the at least one file is associated with a file identifier of the at least one file, and wherein the file identifier is separate from sequence numbers associated with the group of data packets;
   transmitting, to the UE, after transmitting a last data packet of the group of data packets of the at least one file, a request for the UE to report a reception status of the at least one file;
   transmitting, to the UE, one or more repair bits for the at least one file;
   receiving an acknowledgment from the UE for the at least one file; and
   ceasing transmission of the one or more repair bits upon reception of the acknowledgment from the UE.

2. The method of claim 1, further comprising:
   receiving, from a user plane function (UPF), an indication of which data packet of the group of data packets of the at least one file is the last data packet of the group of data packets of the at least one file.

3. The method of claim 1, further comprising:
   identifying the last data packet of the group of data packets of the at least one file based on not receiving any data packets of the at least one file after a threshold period of time.

4. The method of claim 1, wherein the one or more repair bits are generated by a forward error correction (FEC) encoder.

5. The method of claim 4, wherein the FEC encoder utilizes a fountain code or a block code.

6. The method of claim 1, further comprising:
   automatically transmitting the one or more repair bits until the acknowledgment is received from the UE.

7. The method of claim 1, further comprising:
   transmitting the one or more repair bits only based on reception of a negative acknowledgment from the UE prior to the acknowledgment from the UE.

8. The method of claim 1, wherein the group of data packets of the at least one file and the one or more repair bits comprise packet data convergence protocol (PDCP) layer packets.

9. The method of claim 1, wherein the group of data packets of the at least one file and the one or more repair bits comprise radio link control (RLC) layer packets.

10. The method of claim 1, wherein the request for the UE to report the reception status of the at least one file comprises a bit in a header of the last data packet of the group of data packets of the at least one file.

11. The method of claim 1, wherein the request for the UE to report the reception status of the at least one file comprises a control packet transmitted to the UE after the last data packet of the group of data packets of the at least one file.

12. The method of claim 1, wherein the acknowledgment from the UE comprises a PDCP status report message.

13. The method of claim 1, wherein the acknowledgment from the UE comprises an RLC status protocol data unit (PDU).

14. The method of claim 1, wherein the acknowledgment from the UE comprises a control packet that includes the acknowledgment and the file identifier.

15. The method of claim 1, wherein the acknowledgment from the UE comprises an uplink control information (UCI) message.

16. The method of claim 1, wherein the at least one file is destined for an extended reality (XR) application associated with the UE.

17. A method of wireless communication performed by a user equipment (UE), comprising:
   receiving, from a base station, at least one file via an unacknowledged mode radio link, the at least one file comprising a group of data packets, wherein each data packet of the group of data packets of the at least one file is associated with a file identifier of the at least one file, and wherein the file identifier is separate from sequence numbers associated with the group of data packets;

receiving, from the base station, a request for the UE to report a reception status of the at least one file;

receiving, from the base station, one or more repair bits for the at least one file; and transmitting, to the base station, an acknowledgment for the at least one file.

18. The method of claim 17, wherein the one or more repair bits are generated by a forward error correction (FEC) encoder.

19. The method of claim 18, wherein the FEC encoder utilizes a fountain code or a block code.

20. The method of claim 17, wherein the group of data packets of the at least one file and the one or more repair bits comprise packet data convergence protocol (PDCP) layer packets.

21. The method of claim 17, wherein the group of data packets of the at least one file and the one or more repair bits comprise radio link control (RLC) layer packets.

22. The method of claim 17, wherein the request for the UE to report the reception status of the at least one file comprises a bit in a header of a last data packet of the group of data packets of the at least one file.

23. The method of claim 17, wherein the request for the UE to report the reception status of the at least one file comprises a control packet received at the UE after a last data packet of the group of data packets of the at least one file.

24. The method of claim 17, wherein the acknowledgment comprises a PDCP status report message.

25. The method of claim 17, wherein the acknowledgment comprises an RLC status protocol data unit (PDU).

26. The method of claim 17, wherein the acknowledgment comprises a control packet that includes the acknowledgment and the file identifier.

27. The method of claim 17, wherein the acknowledgment comprises an uplink control information (UCI) message.

28. The method of claim 17, wherein the at least one file is destined for an extended reality (XR) application associated with the UE.

29. A network entity, comprising:
a memory;
at least one transceiver; and
at least one processor communicatively coupled to the memory and the at least one transceiver, the at least one processor configured to:
cause the at least one transceiver to transmit, to a user equipment (UE), at least one file via an unacknowledged mode radio link, the at least one file comprising a group of data packets, wherein each data packet of the group of data packets of the at least one file is associated with a file identifier of the at least one file, and wherein the file identifier is separate from sequence numbers associated with the group of data packets;
cause the at least one transceiver to transmit, to the UE, after transmission of a last data packet of the group of data packets of the at least one file, a request for the UE to report a reception status of the at least one file;
cause the at least one transceiver to transmit, to the UE, one or more repair bits for the at least one file;
receive, via the at least one transceiver, an acknowledgment from the UE for the at least one file; and
cause the at least one transceiver to cease transmission of the one or more repair bits upon reception of the acknowledgment from the UE.

30. A user equipment (UE), comprising:
a memory;
at least one transceiver; and
at least one processor communicatively coupled to the memory and the at least one transceiver, the at least one processor configured to:
receive, from a base station, via the at least one transceiver, at least one file via an unacknowledged mode radio link, the at least one file comprising a group of data packets, wherein each data packet of the group of data packets of the at least one file is associated with a file identifier of the at least one file, and wherein the file identifier is separate from sequence numbers associated with the group of data packets;
receive, from the base station, via the at least one transceiver, a request for the UE to report a reception status of the at least one file;
receive, from the base station, via the at least one transceiver, one or more repair bits for the at least one file; and
cause the at least one transceiver to transmit, to the base station, an acknowledgment for the at least one file.

* * * * *